United States Patent [19]
Miller

[11] Patent Number: 4,700,685
[45] Date of Patent: Oct. 20, 1987

[54] COMBINATION CONVECTION AND STEAMER OVEN
[75] Inventor: Ben Miller, Fort Wayne, Ind.
[73] Assignee: Lincoln Foodservice Products, Inc., Fort Wayne, Ind.
[21] Appl. No.: 861,432
[22] Filed: May 9, 1986
[51] Int. Cl.[4] ............................................. A21B 1/08
[52] U.S. Cl. ...................................... 126/20; 126/21 A; 126/369; 99/330; 99/401; 99/468; 219/400; 219/401; 426/510; 426/523
[58] Field of Search .................... 126/20, 21 R, 21 A, 126/369, 369.1, 369.2, 20.1, 20.2; 426/510, 523; 99/468, 469, 330, 447, 401, 339; 219/400, 401; 261/90

[56] References Cited

U.S. PATENT DOCUMENTS

| | | | |
|---|---|---|---|
| 369,836 | 9/1887 | Blackman | 162/22 |
| 976,252 | 11/1910 | Delaih | 126/39 C |
| 1,349,130 | 8/1920 | Hadaway | 219/378 |
| 1,532,086 | 3/1925 | Shroyer | 219/401 |
| 1,651,509 | 12/1927 | Brims | 126/20.2 |
| 1,814,122 | 7/1931 | Bryson | 126/20.2 |
| 2,218,625 | 10/1940 | Rudigier | 196/126 |
| 2,490,076 | 12/1949 | Maxson | 219/35 |
| 2,617,349 | 11/1952 | Tucker | 99/234 |
| 2,636,969 | 4/1953 | Lewis | 219/19 |
| 3,066,213 | 11/1962 | Webber | 219/35 |
| 3,069,994 | 12/1962 | Lewis | 99/234 |
| 3,077,530 | 2/1963 | Chase | 219/38 |
| 3,191,518 | 6/1965 | Pavelka | 99/234 |
| 3,192,167 | 6/1965 | Ogawa | 252/359 |
| 3,320,945 | 5/1967 | Dunkelman | 126/369 |
| 3,502,065 | 3/1970 | Lassiter | 126/20 |
| 3,639,725 | 2/1972 | Maniscalco | 219/401 |
| 3,677,171 | 7/1972 | LeVan | 99/339 |
| 3,731,614 | 5/1973 | Smith | 99/404 |
| 3,732,396 | 5/1973 | Tucker | 219/401 |
| 3,735,749 | 5/1973 | Binks | 126/20 |
| 3,736,860 | 6/1973 | Vischer | 99/339 |
| 3,774,008 | 11/1973 | Maniscalco | 219/401 |
| 3,794,016 | 2/1974 | Binks | 126/369 |
| 3,814,901 | 6/1974 | Morhack | 219/401 |
| 3,820,524 | 6/1974 | Buckell | 126/20 |
| 3,902,044 | 8/1975 | Doyle | 219/284 |
| 3,908,533 | 9/1975 | Fagerstiom | 99/386 |
| 3,991,737 | 11/1976 | Del Fabbro | 126/21 |
| 4,010,349 | 3/1977 | Lee | 219/401 |
| 4,011,805 | 3/1977 | Vegh | 99/467 |
| 4,039,776 | 8/1977 | Roderick | 219/401 |
| 4,121,509 | 10/1978 | Baker | 99/386 |
| 4,123,969 | 11/1978 | Abbate | 99/467 |
| 4,145,604 | 3/1979 | Carlson | 219/439 |
| 4,154,861 | 5/1979 | Smith | 426/466 |
| 4,173,215 | 11/1979 | Bureau | 126/369 |
| 4,202,259 | 5/1980 | Johansson | 99/352 |
| 4,264,539 | 4/1981 | Berg | 261/142 |
| 4,343,292 | 8/1982 | Kells | 126/378 |
| 4,366,749 | 1/1983 | Caridis | 99/339 |
| 4,367,724 | 1/1983 | Willett | 126/20 |
| 4,409,453 | 10/1983 | Smith | 219/10.55 |
| 4,426,923 | 1/1984 | Ohata | 99/468 |
| 4,436,082 | 3/1984 | Hiller | 126/348 |
| 4,438,572 | 3/1984 | Kaminski | 34/218 |
| 4,462,383 | 6/1984 | Henke | 126/21 |
| 4,467,783 | 8/1984 | Hurley | 126/378 |
| 4,495,932 | 1/1985 | Bratton | 126/20 |
| 4,506,598 | 3/1985 | Meister | 99/330 |
| 4,587,946 | 5/1986 | Doyon et al. | 126/21 A |

FOREIGN PATENT DOCUMENTS

| | | |
|---|---|---|
| 929369 | 7/1973 | Canada . |
| 50-10944 | 4/1975 | Japan . |
| 1359294 | 7/1974 | United Kingdom . |

Primary Examiner—James C. Yeung
Attorney, Agent, or Firm—Jeffers, Hoffman & Niewyk

[57] ABSTRACT

A cooking oven for cooking foodstuffs with either steam or forced convection hot air. In the steam mode, steam is continuously generated in the oven cavity. Alternatively, in the convection mode, the amount of moisture supplied to the cavity is controlled. A fan circulates the air or steam in the oven cavity. The steam is generated by means of a slinger cup to which water is supplied and from which water will flow in a thin film over an edge portion of the cup to be slung outwardly and to be atomized thereby by centrifugal force. The atomized water is then caused to flow, by means of the fan, over a heater to be heated thereby whereby the atomized water flashes into water vapor or steam. The oven is operated at atmospheric pressure. Food juices and condensed steam or water vapor which collect in the bottom of the oven will be drained therefrom by means of a drain which is open to the atmosphere. The oven temperature is selectively variable by means of an automatic control.

24 Claims, 8 Drawing Figures

COMBINATION CONVECTION AND STEAMER OVEN

BACKGROUND OF THE INVENTION

This invention relates to an oven and more particularly to a cooking oven for cooking foodstuffs by means of either steam, dry convection hot air or moist convection hot air.

In particular, this invention relates to a food cooking oven which may be operated in three distinct cooking modes and wherein the oven is operated at atmospheric pressure. Cooking may be accomplished in an atmosphere of steam which has been generated within the oven cavity, by means of convection hot air to which water vapor has been added, or by means of dry convection hot air.

Prior art food preparation ovens have been provided which cook or bake food by means of convection air and wherein moisture is added to the oven cavity to prevent the food from drying out and to provide high quality prepared food. Such ovens do not have the ability to cook food by means of steam and therefore do not have the advantages of ovens wherein food is cooked by means of steam. Steam is a very effective heat transfer medium since the latent heat of vaporization needed to turn water into steam requires a great deal of thermal energy. When the steam condenses on a food product, this thermal energy will be given up directly to the food product. Steam is, therefore, a much more effective heat transfer medium than is hot air. By cooking food products in an oven in an atmosphere of steam, a great deal of energy will, therefore, be rapidly transferred to the food products. An additional benefit of cooking food products with steam is that it prevents drying out of the food products as would occur if the food product were cooked with dry, hot convection air. It is therefore desirable, in order to provide a cooking oven wherein food can be prepared quickly and efficiently, to circulate steam continuously within the oven cavity to cook the food products located therein. Furthermore, since the steam in the oven cavity will continuously condense on the food products as well as on the oven walls, it is desired to continuously generate more steam and to supply this steam continuously to the oven cavity.

It is also desired to provide a versatile oven which can cook food products in three distinct modes so that the food may be cooked either with steam only, with convection hot air to which water vapor has been added, or with dry convection hot air.

Some prior art steamer ovens have been provided wherein the condensed steam is collected in the bottom of the oven where it is reheated and reconverted to steam for recirculation in the oven. A problem with these types of ovens is that food, as it is cooked, will lose a certain amount of moisture or juice, which moisture will collect in the bottom of the oven and mix with the condensed steam. Therefore, the condensate reheating process in such prior art ovens reheats not only the condensed steam but also the collected food juices. Steam generated from this collected combined steam condensate and food juice will contain a certain amount of flavoring derived from the collected food juices. If several foods are prepared in the oven at one time, this food flavoring will be deposited on all of the food as the regenerated steam condenses and, therefore, will affect the flavor and taste of the foods, which is, of course, undesirable. It is, therefore, desired to provide an oven wherein the juices which are cooked out of the foods are disposed of so that they will not adversely affect the flavor of the foods in the oven.

Still other prior art steamer ovens have been provided wherein an external steam generator is provided to generate the steam, which is then transferred into the oven cavity. The structure of such prior art ovens is rather complicated and the ovens are, therefore, relatively expensive. Furthermore, since some of the thermal energy in the steam is lost during the transfer of the steam from the steam generator to the oven cavity, the steam used in these ovens is generally lower in temperature than desired and these prior art ovens are also relatively inefficient in the use of energy. It is, therefore, desired to provide a food preparation oven wherein steam is generated in the oven cavity by means of a simple and reliable steam generator.

Yet other types of prior art steamer food preparation apparatuses have been provided wherein the cooking cavity is pressurized. Such apparatuses tend to be relatively complex and must be provided with complicated, and therefore expensive, sealing structures, which of course is undesirable. It is, therefore, desired to provide a cooking oven for cooking foodstuffs by means of steam or convection air wherein the oven cavity is operated at atmospheric pressure.

A still further problem with prior art steamer food preparation ovens has been that the water from which the steam is generated generally contains some dissolved minerals. These minerals will remain behind when the water is turned into steam. With time, the minerals tend to collect in the steam generating apparatus and on the walls of the oven, thus leading to operational difficulties over a period of time as well as causing unsightly deposits. It is, therefore, desired to provide a steam and convection oven wherein such undesirable mineral deposits are minimized or eliminated.

Still further food preparation ovens have been provided wherein food is cooked by means of dry convection hot air. While such ovens operate satisfactorily for certain food products, in certain situations it is desired to cook food by means of hot air to which water vapor has been added or to cook food by means of steam. It is, therefore, desired to provide a versatile oven which may be operated in three modes so that the most suitable cooking mode may be selected for preparing food.

SUMMARY OF THE INVENTION

The present invention, in one form thereof, provides a method and apparatus for cooking foodstuffs in an oven with either steam, convection hot air to which water vapor has been added, or dry convection hot air and wherein the oven includes an oven cavity, a heater located in the cavity, a supply source of water, and an apparatus for atomizing the water. A fan is provided for generating convection currents in the oven cavity and for conducting the atomized water over the heater whereby the water droplets are flashed into steam. The fan continuously circulates the steam or air in the oven cavity. In the steam mode, the cooking method comprises the steps of continuously supplying water to the oven, atomizing the supplied water and continuously converting the atomized water to steam by passing it over the heater by action of the fan. The oven cavity is maintained at a selected temperature by controlling the heater. The steam in the cavity is continuously recirculated over the heater and the oven cavity is maintained at atmospheric pressure.

In the moist hot air convection mode, a selected quantity of water is cyclically supplied to the oven cavity where it is converted into water vapor by the combined action of the heater and the fan. Furthermore, the oven cavity is maintained at a selected variable temperature by means of the heater. Thus, by selecting the amount of water which is cyclically added to the oven cavity, the moisture level of the air in the oven cavity can be regulated. Furthermore, the range of selectable temperatures for operation of the oven in the hot air convection mode is greater than in the steaming mode.

In the dry hot air convection mode, the fan circulates the air but no moisture is added to the oven cavity. In this mode, the temperature of the oven cavity may also be selected as desired.

The present invention, in one form thereof, further comprises a cooking oven and method for cooking food products with either steam or convection hot air. In the steam mode, steam is continuously generated and recirculated within the oven. The steam is generated by continuously supplying water to a slinger cup which is arranged coaxially with a radial fan. The slinger cup includes a reverse taper and a relatively sharp circular edge whereby water flows in a thin film over the edge of the slinger cup and is then slung outwardly and atomized by centrifugal force. The fan will then cause the atomized water to flow over the heater whereby the atomized water droplets will be flashed into steam by contact with a heat source. The steam will condense primarily on the food products and somewhat on the walls of the oven, and will run downwardly into the bottom of the oven, from which it will be discharged through a drain. The oven cavity is maintained at atmospheric pressure because the drain is open to the atmosphere.

The present invention, in one form thereof, still further comprises a steam and convection cooking oven for cooking foodstuffs. The oven includes an oven cavity, a heater located in the cavity and a fan for circulating either air or steam in the cavity. A water supply supplies water to a water receiving cup in the cavity from which the water is slung onto the heater. A temperature control is also provided for selectively controlling the temperature in the oven cavity. A mode selection switch is provided to selectively cause the oven cavity to be supplied with either steam or convection air. If the convection air mode is selected, the air may be selected to be either moist or dry, and the level of moisture may be selectively varied and controlled.

In the operation of the oven in the moist hot air convection mode, water vapor is generated by the same method as in the steam mode. However, in the moist hot air convection mode, water is not continuously added to the oven but is added periodically in selected quantities. Thus, by selecting the quantity of water which is periodically added to the oven, the moisture level of the air in the oven cavity may be controlled. The temperature of the oven cavity in the hot air convection mode may be varied to accommodate a greater range of temperatures in the oven cavity than is possible in the steam mode.

One advantage of the oven according to the present invention is that the oven is versatile and may be operated in various modes to cook food either with steam only, with moist convection hot air, or with dry convection hot air.

Another advantage of the oven according to the instant invention is that the steam generator is simple yet very effective. Furthermore, the steam generator is located in the oven cavity so that it is energy efficient.

Yet another advantage of the present invention is that, by continuously generating high temperature, super-saturated steam at atmospheric pressure in the oven cavity, the oven prepares high-quality food products quickly and efficiently.

A still further advantage of the oven according to the present invention is that the oven is self cleaning since mineral deposits will be continuously washed from the oven cavity walls by condensed steam. Furthermore, since juices and drippings from the food products will be continuously drained from the oven cavity, no undesirable redeposition will occur of flavors on the food product in the oven cavity.

A yet further advantage of the present invention is that the oven cavity is not pressurized but operates at atmospheric pressure whereby complex sealing structures do not need to be provided for the oven.

The present invention, in one form thereof, comprises a method for heating foodstuffs by means of steam in an oven. The oven includes an oven cavity, a heater, a water supply for the oven and a means for atomizing the supplied water. A fan is also provided for conducting the atomized water over the heater to generate steam and to continuously circulate the steam in the oven cavity. The heater is selectively controlled by a control means to maintain the oven cavity at a selected temperature. The method comprises the steps of continuously supplying water to the oven, continuously atomizing the supplied water and continuously converting the atomized water to steam while maintaining the oven cavity at atmospheric pressure.

The present invention, in one form thereof, comprises a cooking oven for cooking foodstuffs with either steam or convection air whose moisture content may be controlled. The oven includes an oven cavity, a heater in the oven cavity, and an air moving means for circulating steam or air in the oven cavity. Means are provided for supplying water to the oven cavity. The improvement in the cooking oven comprises a rotatable slinger cup operatively associated with a water supply means for receiving water therefrom. The cup includes an interior surface with an inverse taper which slopes away from the edge of the cup whereby a volume of water will tend to collect in the cup and whereby only a thin layer of water will flow over the edge of the cup to be atomized by centrifugal force.

The present invention, in one form thereof, still further provides a cooking oven for cooking foodstuffs with steam or convection air. The oven comprises an oven cavity, a heater disposed in the oven cavity, and control means operatively associated with the heater to maintain a selected temperature in the oven cavity. A rotatable air moving means is provided in the oven cavity for causing a stream of air or steam to flow over the heater and for generating convection currents in the oven cavity. A slinger cup is mounted coaxially with the air moving means and is rotatable therewith, the cup including an edge portion and a reservoir portion for retaining a liquid therein. Means is provided for supplying water to the slinger cup whereby a volume of water will collect in the reservoir portion and whereby a thin layer of water will overflow the edge portion and will be slung outwardly and atomized by the combined effects of centrifugal force and the air moving action of the fan. The heater causes the atomized water to be flashed into vapor or steam.

It is an object of the present invention to provide a versatile oven which may be operated in three modes to cook food with either steam, with hot moist convection air, or with hot dry convection air.

Another object of the present invention is to provide a steam or convection oven wherein the steam is generated by a very simple, yet very effective and energy efficient, steam generating structure within the oven cavity.

Yet another object of the present invention is to provide a steam or convection oven wherein the oven cavity is maintained at atmospheric pressure.

Still another object of the present invention is to provide a steam or convection oven wherein, in the steam mode, water is continuously supplied to the oven cavity and wherein, in the moist hot air convection mode, selected amounts of water are periodically added to the oven cavity.

A yet further object of the invention is to provide a method for cooking food with either steam or convection air.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1-4, oven 10 is shown including an oven cabinet 12 having a door 14 which is latched by means of a latch 13. A door 14 is supported on a pair of hinges 15. A control panel 16 is shown including a plurality of controls 17A-17D mounted thereon for control of the oven. The oven includes a cavity 18, a pair of side walls 20 and 22, a top wall 21 and a bottom wall 23. Walls 20-23 and door 14 of the cabinet are preferably insulated with insulation material which is inserted in the hollow space between the wall panels, as is conventional. A plurality of horizontally arranged rails 24 are supported by vertical standoffs 25 which in turn are secured to walls 20 and 22. Rails 24 support a plurality of trays (not shown) on which food items are supported for preparation in the oven.

Referring further to FIGS. 1-4, a fan 26 is rotatably mounted at the back portion of the oven cavity and including a motor 28 having a rotatable motor shaft 30 secured to fan 26. Motor 28 is secured to back wall 32 of oven 10 by means of a plurality of bolts 34. Fan 26 is concentric with and is surrounded by a plurality of heaters 36 which, in the preferred embodiment shown herein, comprise three axially spaced, generally circular heaters. These heaters are conventional in design and may be made of Calrod material. A sensor 38 is located in oven cavity 18 to provide an indication of the temperature of the air or steam in oven cavity 18 thereby enabling a control circuit to maintain the temperature of the air or steam in oven cavity 18 within selected temperature limits as further explained hereinafter.

Figure 3:
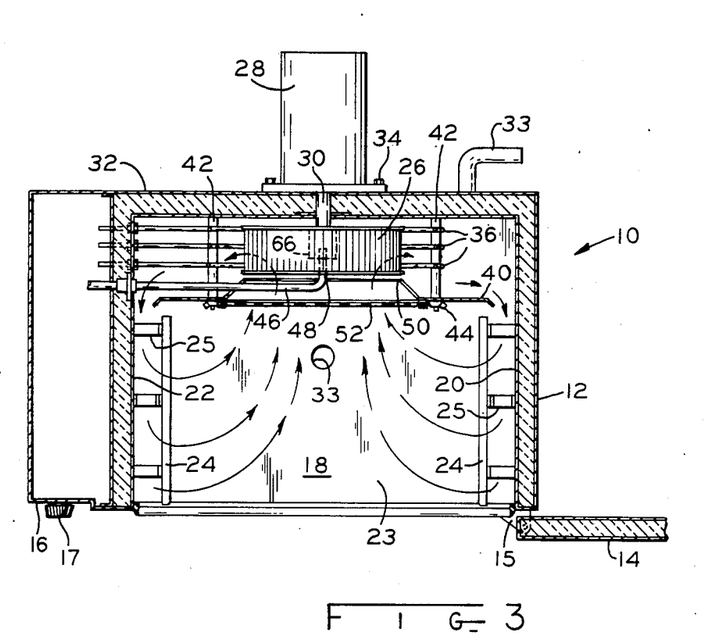
FIG. 3 is a view, in cross section, of the oven taken along line 3—3 of FIG. 1.
Figure 4:
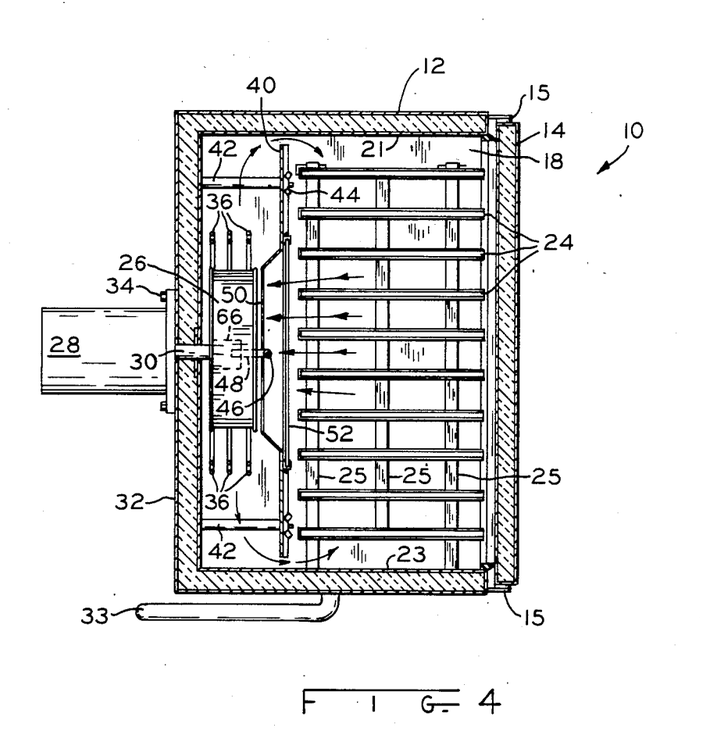
FIG. 4 is a view, in cross-section, of the oven taken along line 4—4 of FIG. 1.

A deflector panel 40 is arranged in oven cavity 18 in front of fan 26 and heaters 36. Deflector panel 40 is supported on a plurality of standoffs 42 which in turn are supported on the oven back wall 32. Wing nuts 44 secure panel 40 on standoffs 42. A water supply comprising a small tube 46 having an elbow portion 48 is arranged in oven cavity 18 with the outlet of tube 46 arranged substantially coaxially with shaft 30 of motor 28. Tube 46, by way of example, has a diameter in the range of $\frac{1}{8}$ inch to $\frac{1}{2}$ inch. Water supply tube 46 is connected to a conventional supply of water (not shown) for the supply of water to oven cavity 18. Thus, at a water supply pressure of 30-110 pounds per square inch, water supply tube 46 can continuously supply a quantity of 10-20 cubic inches of water per minute to oven cavity 18. Deflector panel 40 includes a circular opening 50 which is covered by means of a screen 52 supported on screen support brackets 54, four of which are shown in the disclosed embodiment. Thus, as best seen in FIGS. 3 and 4, air or steam may be drawn axially into fan 26 through opening 50 in deflector panel 40 and may then be moved radially outwardly by fan 26 across heaters 36, whereafter the air or steam is deflected by deflector panel 40 and caused to flow along side walls 20 and 22, top wall 21 and bottom wall 23 of oven 10 and over the foodstuffs (not shown) located on the support trays (not shown) and back to fan 26 through opening 50.

Figure 1:
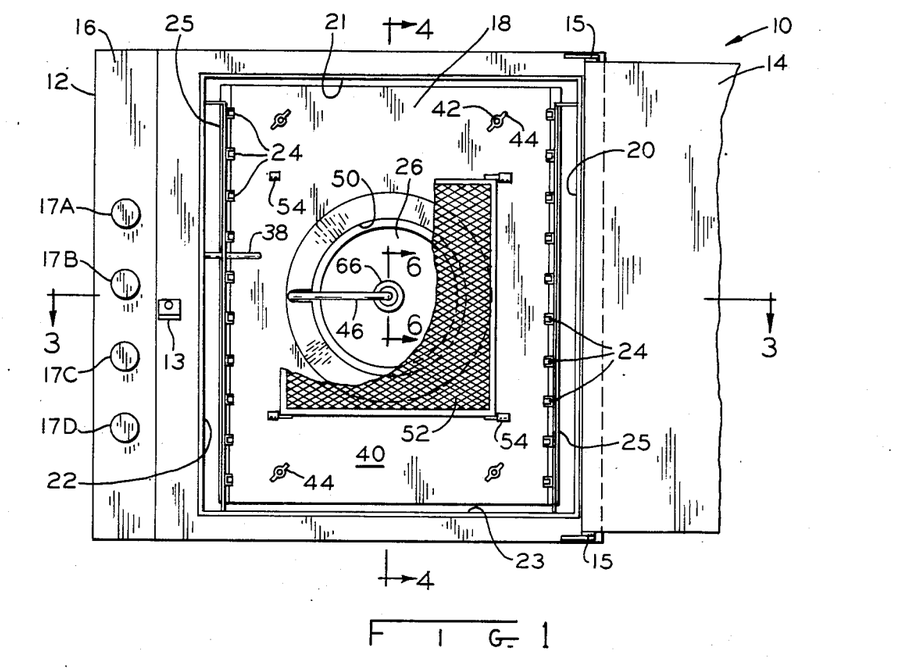
FIG. 1 is an elevational view of the oven according to the present invention with the oven door shown in the open position.
Figure 2:
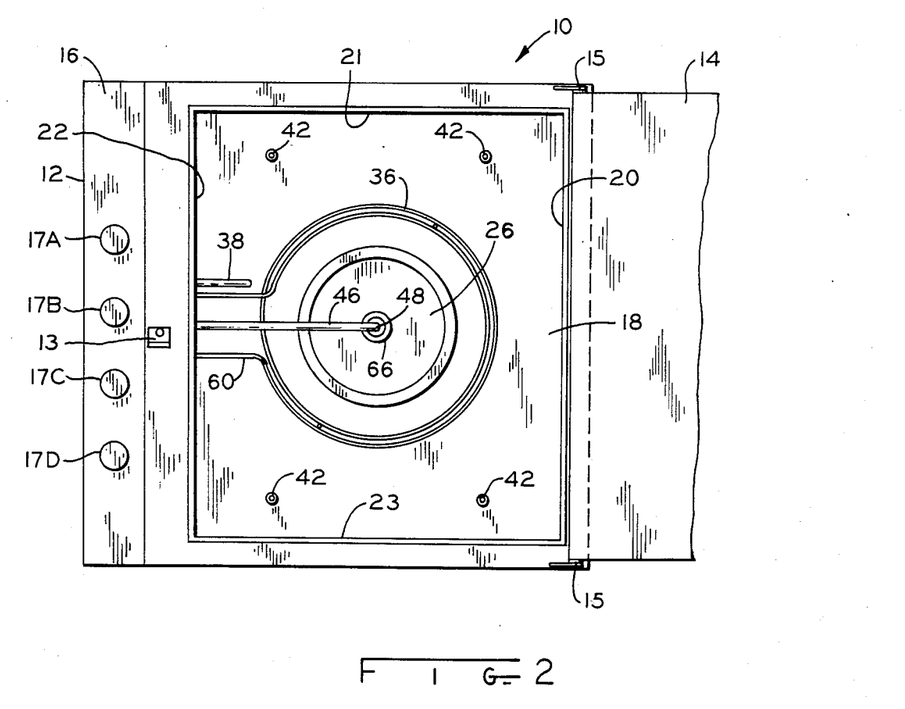
FIG. 2 is an elevational view of the oven of FIG. 1 with the oven door shown in the open position and with the screen and air deflector thereof removed.
Figure 5:
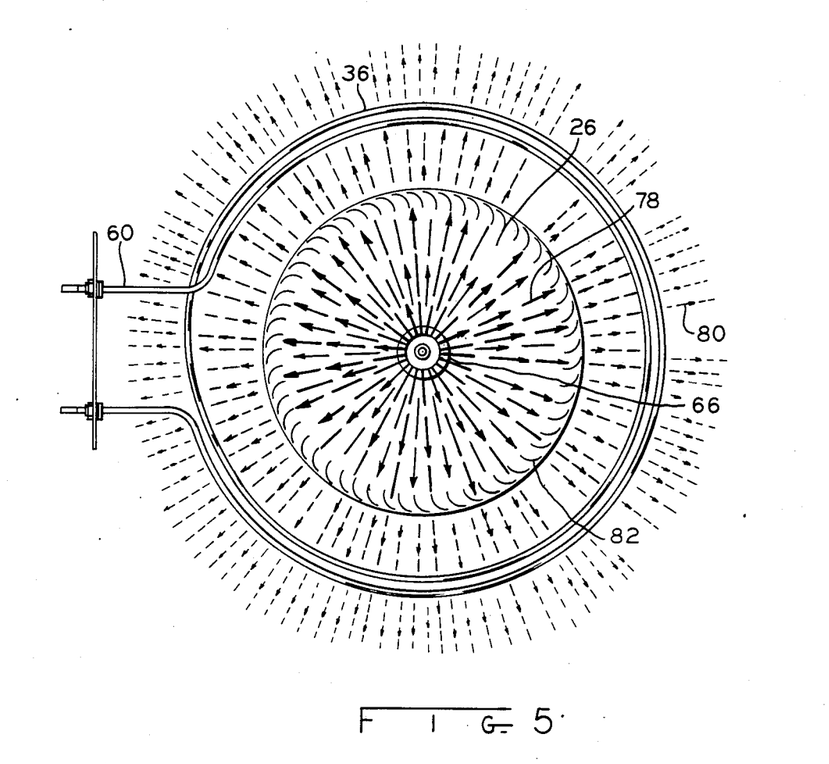
FIG. 5 is an enlarged view of the fan and heater assembly of the oven of FIG. 1.
Figure 6:
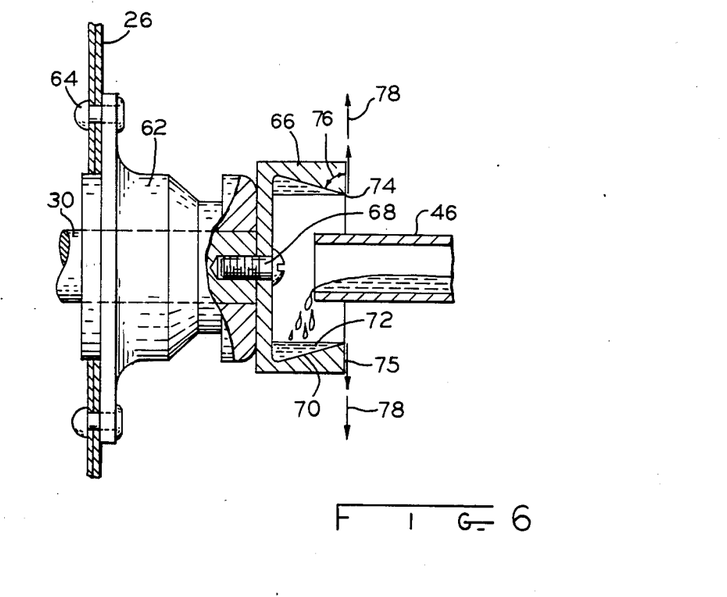
FIG. 6 is a partial, enlarged, cross-sectional view of the slinger cup and water supply assembly of the oven taken along line 6—6 of FIG. 1.

By referring to FIGS. 2, 5, and 6, heaters 36 are shown to include heater connector portions 60 for connecting the heaters to a source of electrical supply. Furthermore, fan 26 is mounted on a fan hub 62 which in turn is secured to motor shaft 30 and rotates therewith. Fan 26 is secured to hub 62 by means of a plurality of rivets 64. A slinger cup 66 is secured to motor shaft 30 forwardly of fan hub 62 by means of a threaded fastener 68. Cup 66 includes an interior surface which has an inverse tapered portion 70 to form a liquid retention volume 72 in cup 66. Thus, when cup 66 is rotated with shaft 30, centrifugal force will cause water which flows from water supply tube 46 into liquid retention volume 72 to be retained therein by means of centrifugal force. The front surface 75 of cup 66 is generally vertical and is disposed at an angle 76 with respect to the inverse tapered surface portion 70 thereby forming an edge 74. Angle 76 is preferably in the range of 70° to 85°. If water is continuously added to cup 66 while the cup rotates, the volume of water will overflow edge 74 of the cup. Edge 74 is preferably rather sharp so that only a thin layer of water will flow from volume 72 over edge 74. As the thin film or layer of water flows over edge 74, this water is spun off, or slung, outwardly in a thin sheet of water indicated at 78 by the operation of centrifugal force. This slinging action will cause the water to be atomized because of the relatively high speed with which cup 66 rotates and the centrifugal forces acting on the thin sheet of water 78. The speed of rotation of cup 66 is preferably in the range of 960 rpm to 3600 rpm. In a typical arrangement, the speed of rotation of cup 66 is 1600 rpm.

The atomized particles of water will flow outwardly in a circular pattern, as best seen in FIGS. 5 and 6, and will flow through fan blades 82 of fan 26 and across heaters 36 to be heated thereby, whereby the water particles will flash into steam. Since the droplets of moisture, as they are spun off from slinger cup 66, are very small, the fan blades 82 of fan 26 will not need to break up the droplets into an even finer mist. Furthermore, since the water droplets are substantially completely atomized when they flow across heaters 36, the transfer of thermal energy from heaters 36 to the atomized water droplets is rapid so that the conversion of the atomized water to steam is very efficient and is readily accomplished.

Figure 7:
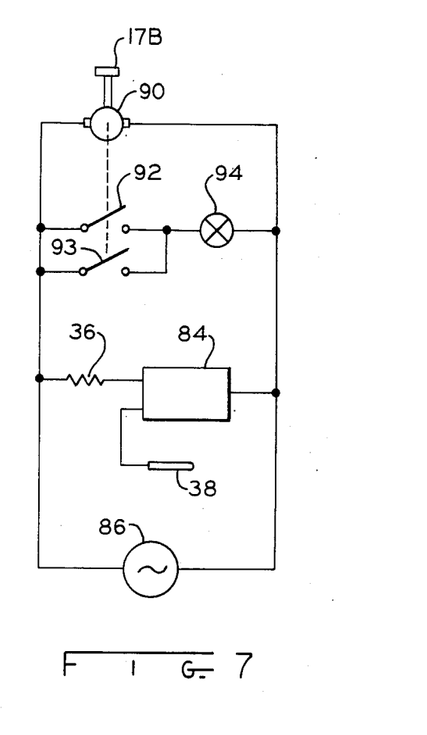
FIG. 7 is a schematic electrical diagram of the heater circuit for the oven of FIG. 1.

Referring now to FIG. 7, an electrical schematic circuit diagram is shown for the operation of the oven. A source of alternating electric voltage 86 is connected to heaters 36 by way of a thermostat 84. Thermostat 84 also receives an input from temperature sensor 38. Thermostat 84 is conventional and may consist of an on/off bimetal switching arrangement whereby heaters 36 will be turned off when the temperature of steam or air in oven cavity 18, as sensed by sensor 38, exceeds a certain level. When the temperature of the steam or air in oven cavity 18 drops below a certain level, as sensed by sensor 38, control 84 will switch heating elements 36 back into circuit with the electrical source of supply 86, thereby supplying further thermal energy to oven cavity 18 and raising the temperature thereof.

Also connected in parallel with heaters 36 and thermostat 84 is a timer motor 90 including a cam (not shown) which controls the operation of a switch 92 so that switch 92 is cyclically closed and opened. Switch 92 is connected in series with a valve 94 which in turn is connected in series with water supply tube 46 to control the flow of water into cup 66. Timer 90 is selectively controlled by means of a control knob 96 so that the periods of time during which switch 92 is open may be varied. For instance, timer 90 may operate on a one minute cycle. With control knob 96 set at one end of its range, switch 92 will be continuously open. With control knob 96 set at the other end of its range, switch 92 will be continuously closed. With control knob 96 set between the extreme ends of its range, switch 92 will be opened for a predetermined portion of each minute during which timer 90 makes a complete revolution. Thus, knob 96 and timer 90 comprise a cyclical control to cyclically operate valve 94 for predetermined periods. Therefore, the amount of water supplied to cup 66 in oven cavity 18 may be controlled, as desired, by controlling the closure of switch 92 so that shots of water are cyclically added to oven cavity 18 when the oven operates in the moist hot air convection mode. A switch 93 bypasses switch 92 so that valve 94 may be continuously closed as desired.

Figure 8:
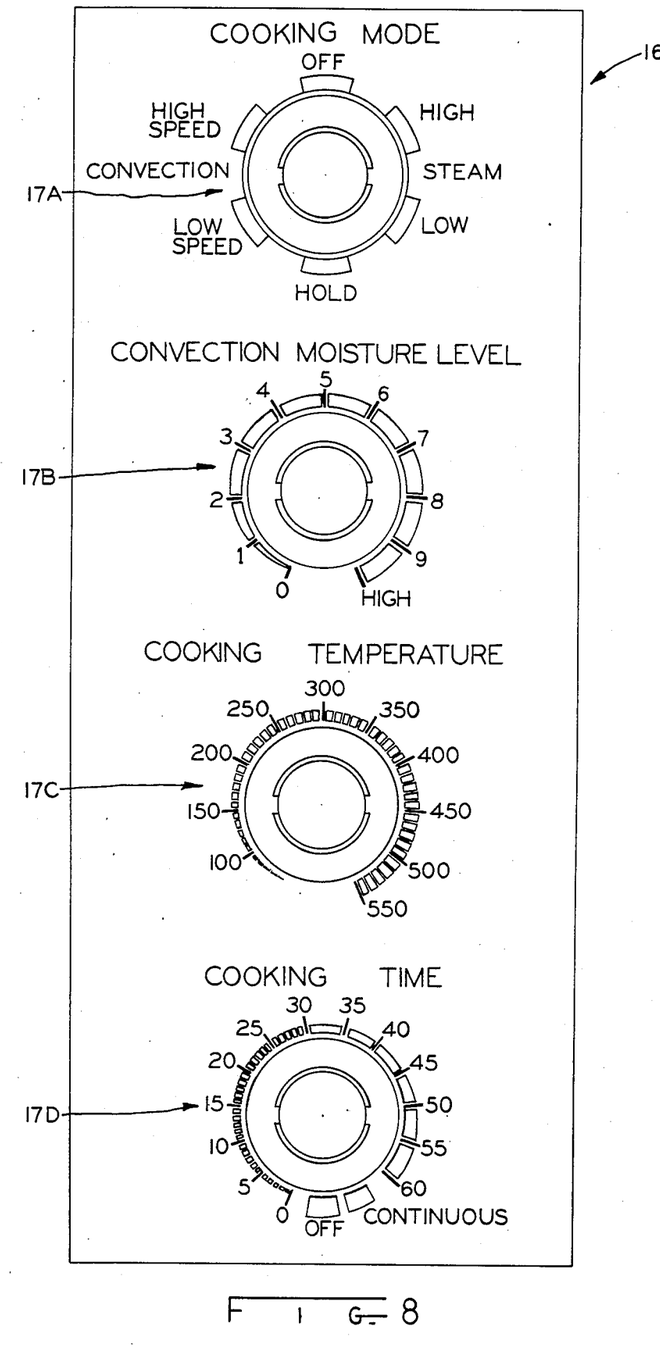
FIG. 8 is an elevational view of the control panel for the oven of FIG. 1.

Referring now to FIG. 8, the control panel for oven 10 is shown in detail. Four control knobs, 17A, 17B, 17C, and 17D are provided. Control knob 17A controls the cooking mode which may be set for either a steam mode or a hot air convection mode. In the steam cooking mode, switch 93 is closed so that water is continuously supplied to the oven cavity for the continuous generation of steam. Two settings are provided in the steam cooking mode, namely a high steam setting and a low steam setting. In the low steam setting, the temperature of the steam is maintained to be in the range of 212°–220°. In the high steam setting, the temperature of the steam is elevated and is maintained in the range of 250°–270°. The temperature of the steam in the steam mode is preset and is automatically maintained in these ranges by selecting either the high steam mode or the low steam mode and is not further controllable by means of temperature control knob 17c. In the steam mode, the fan speed is automatically set for high speed which, in the preferred embodiment, is 1600 rpm.

When the cooking mode control knob 17A is set in the convection mode, the speed of fan 26 may be selected to be high or low. In the preferred embodiment, the high speed setting of the fan is 1600 rpm and the low speed setting of the fan is 1200 rpm. Furthermore, in the convection cooking mode, the temperature of the oven cavity is selected by means of cooking temperature control knob 17C which, in the illustrated embodiment, may be selected anywhere in the range of 100° F.–550° F. In the convection cooking mode, control knob 17B is also enabled so that the convection moisture level may be selected. As explained hereinabove, control knob 17B controls the period of time for each revolution of timer 90 during which switch 92 is closed. Switch 93 is open in the convection mode so that switch 92 is controlling. For the sake of convenience, the range of control for control knob 17B has been divided into ten discrete control settings. Therefore, by selecting, for instance, setting 4 for control knob 17B, switch 92 will be closed 4/10 of each period of revolution of timer 90. Thus, the amount of water which will be added to oven cavity 18 may be controlled to be from 0–60 cubic inches per hour by the setting of control knob 17B. It may also be desired to cook some foods with dry air only. Thus, knob 17B may be adjusted to select the 0 setting. On the other hand, in certain modes of operation, it may be desired to have convection air with a high moisture content. For instance, if it is desired to glaze crusts or the like, it is desired to generate a moist atmosphere so that water vapor will condense on the food products to form a glazed crust. Thus, knob 17B will be adjusted to a higher setting.

The cooking mode control may also be set in the hold setting which will cause oven cavity 18 to be maintained at a selected temperature and moisture level. During this mode, fan 26 is operated in the low speed operation.

Control knob, 17D, may be adjusted to control the amount of cooking time. Knob 17D may also be adjusted to select continuous cooking so that the cooking cycle is not timed.

In operation, therefore, when it is desired to operate the oven in the steam mode, control knob 17A will be set for either the high or the low temperature steam mode. Water will then be continuously supplied to cup 66 and will continuously cause steam to be developed in oven cavity 18 as explained hereinabove. As the water is converted to steam, a small amount of pressure will be developed in oven cavity 18 as the water flashes into steam. This pressure will cause air and some steam to be expelled from oven cavity 18 through drain 33. By continuously generating steam, oven cavity 18 is soon purged of air so that a pure atmosphere of steam is maintained. Fan 26 continuously circulates the steam in cavity 18. As some steam condenses on the food or oven walls, it will collect in the bottom of cavity 18 and will be removed therefrom by drain 33. Cavity 18 will thus be continuously operated at atmospheric pressure because any excess pressure which develops in cavity 18 will cause more steam or air to be expelled through drain 33. Thus, fully saturated steam is continuously generated which causes food present in oven cavity 18 to be cooked quickly and efficiently.

It will be understood that, in the steam mode when the oven is initially turned on and if frozen food has been loaded into the oven, quite a large quantity of steam will be condensed so that the thermal energy supplied by heaters 36 may not be sufficient to quickly create a super-heated steam atmosphere. However, heaters 36 are preferably relatively large, such as, for instance, 13,500 watts and, therefore, this condition will not last very long as the food is quickly heated up.

As explained hereinabove, steam or water vapor which condenses on the cooler food items will drip downwardly from the food items together with any moisture or juice which has cooked out of the food items. These drippings and condensed steam will flow downwardly to be collected in the bottom of the oven and to be discharged therefrom by drain 33. Since all the condensed steam or water vapor and food juices are removed from oven cavity 18 by drain 33, no flavor from the food items will be redeposited on the food items to impart undesirable food flavors thereto. Drain 33, therefore, in addition to draining condensate and food juices from the oven cavity 18, will maintain oven cavity 18 at atmospheric pressure at all times.

In the convection mode, control knob 17A is set for either high speed convection or low speed convection. Furthermore, by setting control knob 17B, the moisture level in oven cavity 18 is selected and controlled. Since water is not continuously supplied to oven cavity 18 in this mode, only water vapor will be generated. Further, in this mode, some water vapor and air may also be expelled from oven cavity 18 by drain 33 as water vapor is generated. However, as some of the water vapor condenses on either the food or the walls of oven cavity 18, a negative pressure is generated in cavity 18 so that air may be drawn into oven cavity 18 in through drain 33 to mix with the air and water vapor which is present in oven cavity 18. In the convection mode, control knob 17C is set to select the desired cavity temperature. If it is desired to maintain food in oven cavity 18 at a selected temperature and moisture level, control knob 17A is set on hold and control knobs 17B and 17C will be adjusted as desired.

What has, therefore, been disclosed is an oven for rapidly and efficiently preparing food items with steam or convection hot air and wherein baked goods as well as vegetables, meats, and the like, including delicate items, may be prepared.

While this invention has been described as having a preferred design, it will be understood that it is capable of further modification. This application is therefore intended to cover any variations, uses, or adaptations of the invention, following the general principles thereof and including such departures from the present disclosure as come within known or customary practice in the art to which this invention pertains and fall within the limits of the appended claims.

What is claimed is:

1. The method for heating foodstuffs with steam in an oven, the oven including an oven cavity, a heater, means for supplying water to the oven cavity means for atomizing water in the oven cavity, a fan for conducting the atomized water over the heater to generate steam and for circulating steam in the oven cavity, and means for selectively controlling the heater, the method comprising the steps of:

continuously supplying water to said oven;
continuously atomizing said supplied water;
continuously converting said atomized water to steam;
controlling said heater to maintain said oven cavity at a selected temperature;
recirculating said steam in said cavity and over said heater; and
maintaining said oven cavity at atmospheric pressure.

2. The method according to claim 1 wherein said selected temperature of said oven cavity is variable.

3. The method according to claim 1 wherein said selected temperature of said oven cavity is maintained by turning said heater on and off by said means for selectively controlling said heater.

4. The method according to claim 1 wherein said continuously supplied water is atomized by flowing said water in a film over a rotating, substantially circular, circumferential edge whereby said film of water is dispersed in a substantially planar circular pattern and is atomized by centrifugal force.

5. In a cooking oven for cooking foodstuffs with either steam or moist convection air, said cooking oven including an oven cavity, a heater in said cavity, air moving means for circulating air or steam in said cavity, and means for supplying water to said cavity, the improvement comprising:

a rotatable slinger cup operatively associated with said water supply means for receiving water therefrom, said cup including an edge portion and an interior surface which tapers inversely away from said edge portion to form an included angle between the plane of said edge portion and said interior surface whereby a volume of water will collect in said cup, and whereby a layer of said water will flow over said edge and will be atomized by centrifugal force.

6. The oven of claim 5 wherein said heater surrounds said cup whereby said atomized water is flashed into steam by said heater.

7. The oven of claim 5 including means for maintaining said cavity at atmospheric pressure.

8. The oven of claim 7 wherein said means for maintaining said oven at substantially atmospheric pressure comprises an open drain for draining condensate from said oven cavity.

9. The oven of claim 5 wherein said included angle is in the range of 70° to 85°.

10. The oven of claim 5 wherein said air moving means comprises a radial flow fan concentrically mounted with said heater whereby air or steam flows generally axially through said cavity toward said fan and then flows radially outwardly from said fan across said heaters.

11. The oven of claim 5 including control means for said water supply means to control the amount of water supplied to said slinger cup.

12. The oven of claim 5 wherein said slinger cup is coaxially mounted with said air moving means for conjoint rotation therewith.

13. A cooking oven for cooking foodstuffs with steam or convection air, the oven comprising:
  an oven cavity;
  a heater disposed in said oven cavity;
  control means operatively associated with said heater to maintain a selected temperature in said oven cavity;
  a rotatable fan in said oven cavity for causing a stream of air or steam to flow over said heater and for generating convection currents in said oven cavity;
  a slinger cup coaxially mounted with said fan and rotatable therewith, said cup including a reservoir portion for retaining a liquid therein, and an edge portion, said reservoir including a surface which tapers away from the plane of said edge portion to form an included angle therewith; and
  means for supplying water to said slinger cup, whereby a volume of water will collect in said reservoir portion and whereby a thin layer of water will overflow said edge portion and will be slung outwardly and atomized by, said heater causing said atomized water to be flashed into vapor or steam.

14. The cooking oven of claim 13 wherein said heater surrounds said fan and is coaxial therewith, whereby said atomized water will flow through the blades of said fan and across said heater.

15. The cooking oven of claim 13 wherein said included angle is in the range of 70° to 85°.

16. The cooking oven of claim 13 wherein said air moving means comprises a radial flow fan concentrically mounted with said heater.

17. The oven of claim 13 including means for maintaining said oven cavity at substantially atmospheric pressure and comprising an open drain for draining condensate from said cavity.

18. The oven of claim 13 including control means for controlling said water supply means, whereby a selected amount of water is cyclically supplied to said cavity.

19. The oven of claim 18 wherein said control means includes a control setting for continuously supplying water to said slinger cup.

20. A steam and convection cooking oven for cooking foodstuffs, the oven comprising:
  an oven cavity;
  a heater disposed in said cavity;
  a fan for circulating air or steam in said cavity;
  water supply means for supplying water to said cavity;
  means for receiving water from said water supply means and for slinging said water onto said heater;
  temperature control means for controlling the temperature in said cavity; and
  mode selection means for causing said cavity to be filled with either steam or convection air.

21. The oven of claim 20 including control means for selectively controlling said water supply means whereby a selected amount of water is cyclically supplied to said receiving means.

22. The oven of claim 21 wherein said control means comprises a timer, a switch, and a valve in said water supply means, said timer controlling the operation of said switch, said timer being selectively adjustable to control the portion of each cycle of said timer during which said switch is closed.

23. The oven of claim 20 wherein selection of a steam atmosphere in said cavity with said mode selection means causes a continuous supply of water to said receiving means.

24. The oven of claim 20 including means for maintaining said cavity at atmospheric pressure.

* * * * *